Figure 1A:
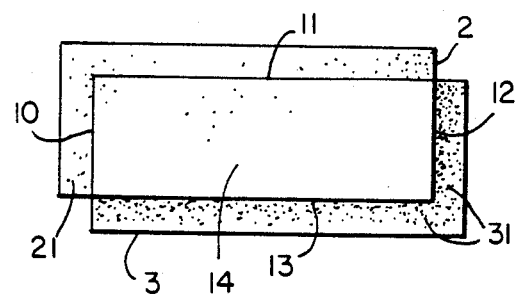

United States Patent [19]

Neuschaeffer et al.

[11] Patent Number: 4,608,795

[45] Date of Patent: Sep. 2, 1986

[54] FACINGS OF INORGANIC MOLDING COMPOSITIONS FOR BUILDING COMPONENTS

[75] Inventors: Karl H. Neuschaeffer, Leichlingen; Paul Spielau, Troisdorf-Eschmar; Hans-Werner Engels, Troisdorf-Sieglar; Guenter Zoche, Bonn, all of Fed. Rep. of Germany

[73] Assignee: Dynamit Nobel Aktiengesellschaft, Troisdorf, Fed. Rep. of Germany

[21] Appl. No.: 562,219

[22] Filed: Dec. 16, 1983

[30] Foreign Application Priority Data

Dec. 16, 1982 [DE] Fed. Rep. of Germany ....... 3246621

[51] Int. Cl.⁴ ................................. E04C 1/00
[52] U.S. Cl. .................... 52/309.12; 52/596; 52/612; 52/592; 106/84
[58] Field of Search ............... 52/235, 243, 433–440, 52/562, 568–572, 578, 589–604, 608–612, 309.4, 309.8, 309.12; 106/76, 84

[56] References Cited

U.S. PATENT DOCUMENTS

| 302,289 | 7/1884 | Shaw | 52/306 |
|---|---|---|---|
| 1,544,478 | 6/1925 | Payne | 52/592 |
| 1,687,342 | 10/1928 | MacVeigh | 52/609 |
| 2,376,163 | 5/1945 | Metzger | 106/84 |
| 2,440,969 | 5/1948 | Nightingall | 106/84 |
| 2,792,704 | 5/1957 | Kooiman | 52/437 |
| 3,776,746 | 12/1973 | Abe | 106/84 |
| 4,031,289 | 6/1977 | Sergovic | 52/612 |
| 4,208,216 | 6/1980 | Yamaguchi | 106/84 |
| 4,349,386 | 9/1982 | Davidovits | 106/85 |
| 4,509,985 | 4/1985 | Davidovits et al. | 106/84 |

FOREIGN PATENT DOCUMENTS

| 2444752 | 4/1976 | Fed. Rep. of Germany | 52/309.1 |
|---|---|---|---|
| 2906679 | 9/1980 | Fed. Rep. of Germany | 52/405 |
| 2500512 | 8/1982 | Fed. Rep. of Germany | 52/561 |
| 1603060 | 4/1971 | France | 52/169.1 |
| 2219130 | 9/1974 | France | 106/84 |
| 2355974 | 2/1978 | France | 52/309.1 |
| 2394647 | 2/1979 | France | 52/309.12 |
| 2457956 | 1/1981 | France | 52/309.1 |
| 145835 | 12/1978 | Japan | 106/84 |
| 606847 | 8/1948 | United Kingdom | 106/84 |
| 2027089A | 2/1980 | United Kingdom | 52/309.4 |
| 722871 | 3/1980 | U.S.S.R. | 106/84 |

Primary Examiner—John E. Murtagh
Assistant Examiner—Andrew Joseph Rudy
Attorney, Agent, or Firm—Antonelli, Terry & Wands

[57] ABSTRACT

Facings for use as building components with a solid molded part constituting the visible side and a foam member of an inorganic and/or organic foam can be produced by shaping and heat curing from inorganic, aqueous molding compositions, wherein the molding composition contains a reactive oxide mixture, an alkali silicate solution, optionally alkali hydroxide, and fillers and auxiliary agents.

13 Claims, 2 Drawing Figures

U.S. Patent     Sep. 2, 1986     4,608,795

FACINGS OF INORGANIC MOLDING COMPOSITIONS FOR BUILDING COMPONENTS

This invention relates to facings or facing elements for use as building components, especially facade slabs, made of firm, stone-like moldings produced from aqueous, flowable or press-moldable molding compositions by shaping and curing at low temperatures.

It is known to manufacture molded components such as clinkers, panels or the like from ceramic materials by baking at high temperatures to far above 800° C. In this process, high temperatures are required for the baking step, and thus a large amount of energy is consumed. Since ceramic materials shrink and rupture at the high baking temperature, the maintenance of accurate dimensions is difficult.

Furthermore, numerous cement-bound building components are known; the breaking strength in case of planar configuration of these components is low, unless they contain fibrous materials, such as asbestos, which is harmful to the health of humans.

Molded components from alkali silicate solutions, on the other hand, require reactants that are difficult to procure, such as metakaolin which can only be produced by annealing (French Patent Application No. 79.22041), and may exhibit blooming when exposed to weathering and in such a case are unsuitable for facings for building componets.

Therefore, an object of this invention is to produce, from readily accessible inorganic raw materials, facings for building components in a simple and energy-saving fashion by curing at a low temperature, these facings being weather-resistant, and having dimensional stability and adequate bending strength.

The object of this invention is a facing for building components, especially facade slabs, comprising a solid molding constituting a visible part or member made of a cured, inorganic molding composition with a specific gravity of 1.3–2.5 g/cm$^3$, preferably 1.5–2.0 g/cm$^3$, prepared from:

10–30% by weight of an aqueous, potassium-alkaline potassium silicate solution;

15–40% by weight of a reactive, pulverulent oxide mixture with contents of amorphous SiO$_2$ and aluminum oxide; and 20–75% by weight of fillers; and of a foamed member, joined to the visible part, based on an inorganic and/or organic foam material.

By the reaction of pulverulent oxide mixtures containing amorphous SiO$_2$ and Al$_2$O$_3$ with alkali silicate solutions with stone formation at temperatures of up to 200° C., molded articles are produced according to this invention from castable or press-moldable molding compositions having high strength, high temperature stability, and very exact dimensional stability; these molded articles, during shaping, can assume the configuration of construction facings of any desired form, especially also those of large dimensions or especially fine texturing.

By establishing a bond with a foamed article which preferably is joined homogeneously with the solid molding during production, high thermal insulation and sound damping can be attained, with simultaneously adequate mechanical properties as demanded for detailed facings, such as facade slabs. In particular, the combination as proposed by the invention, of an inorganic foamed member imparting high ruggedness and contributing due to its open-cell character toward noise damping, and of organic hard foam elements, such as polystyrene, polyurethane, or phenolic resin foam, imparting high thermal insulation, is especially advantageous and technologically advanced.

The moldings (i.e., molded components), due to the curing process, attain ultimate bending strengths in the range from 10 to 35 N/mm$^2$ or, in some cases, even more. The moldings provide very high dimensional trueness and exactly reproduce every detail of the mold, so that even very thin moldings, predetermined surface structures, recesses and undercut areas are reproduced with dimensional accuracy.

Tendency toward crack formation and mold shrinkage is very low so that, in particular, also moldings having large dimensions and large-area, flat moldings can be manufactured.

The construction facings, i.e., building components, elements or structures, can serve, for example, as facings for walls, facades, roofs, as floor panels on the inside or outside and, optionally, in structural parts for buildings.

An especially advantageous embodiment of the construction facing is characterized in that a projecting rib is molded to the body of the molding or molded component, which latter has especially a rectangular basal area, along two successive sides, this rib being flush with the underside of the molding, and in that the foamed part is formed, in the zone of the ribs, in alignment with the sides of the molding and projects, alongside the two sides of the molding free of ribs, in a width corresponding approximately to the width of the ribs past the molding. By the especially offset arrangement of the foamed member, increased thermal insulation is obtained and, in particular, cold bridges are avoided in the joint area of abutting constructional facing elements.

Multiple-layer constructional facings made up of a foam layer and a solid layer, or of differently colored or textured layers can be manufactured by casting various molding compositions—wet in wet—or by casting onto preferably flat moldings which have been preformed in any desired way.

In a further embodiment of the invention, the visible side of the visible part is textured, embossed, decorated or the like. Relief structures, grooves and joints, reproduction of natural material surfaces, contrasting bands of written material or the like, can be obtained solely by a most accurate reproduction of all details of the mold employed. If desired, the facings, especially those of foamed articles, can be subsequently machined by sawing, milling, drilling or the like.

The construction facing element of this invention can be provided with reinforcing inserts of metal and/or glass fiber mats, embedded in the molding composition of the visible part and/or of the foamed member. Mountings on the rear side can be formed during casting or press-molding, or can be cast into place permanently in the form of pins, strips, or the like, of metal, so that there is a simple possibility of mounting the facade slab, for example, to a building wall. Composite parts of materials of any desired kind with a porous rear side or with anchoring means thereon can be obtained by casting the molding composition onto the material and curing same, especially also foaming compositions. The construction facing elements of solid materials with cast-on foam member exhibit good values for thermal and sound insulation and at the same time have a self-supporting structure.

A subsequent covering of the surfaces by impregnation, varnishing, glazing or the like is possible, for example, based on acrylic resins. The solid, cured molded parts exhibit, depending on their composition, densities of 1.5–2.0 g/cm$^3$; the foamed parts of inorganic compositions have densities down to about 0.2 g/cm$^3$, the foamed parts of organic compositions have densities down to 0.02 g/cm$^3$.

A preferred embodiment of the construction facing provides a foamed member consisting of an inorganic, cured and blown molding composition made from:

20–60% by weight of an aqueous potassium-alkaline potassium silicate solution;

30–80% by weight of a reactive, pulverulent oxide mixture with contents of amorphous SiO$_2$ and aluminum oxide; and 0–50% of fillers; and 0.05–5% by weight of blowing agent, with a gas formation temperature of between 20° and 95° C.

The foamed member and the solid molding are based on the same inorganic raw materials and result in a nonflammable product, which is especially important for use in the construction sector.

In an advantageous mode of operation for manufacturing the construction facing elements, there is mixed into a solids mixture of 15–40 parts by weight of reactive oxide mixture with contents of amorphous SiO$_2$ and aluminum oxide and 20–75% by weight of fillers:

10–30% by weight of a 28–65% by weight aqueous potassium-alkaline solution of potassium silicate containing 0.5–2.5 parts by weight of K$_2$O, preferably 0.6–1.6 parts by weight of K$_2$O per one part by weight of dissolved SiO$_2$, and this mixture is cast or poured into a mold to form the molding constituting the visible part, then optionally vented and pressed and cured at temperatures of 50°–200° C., preferably below 100° C., and thereafter a foamable mixture of 20–60% by weight of an aqueous potassium-alkaline potassium silicate solution containing 0.5–2.5, preferably 0.6–1.6 parts by weight of K$_2$O per part by weight of dissolved SiO$_2$, 30–80% by weight of a reactive, pulverulent oxide mixture with contents of amorphous SiO$_2$ and aluminum oxide, optionally up to 50% by weight of fillers, as well as 0.05–5% by weight of blowing agent with a gas forming temperature of between 20° and 95° C., is charged into the mold on top of the visible part and under foaming and curing at temperatures of 50°–200° C., preferably below 100° C., the foamed member is bonded to the visible part.

It is, of course, also possible first to produce and cure the foamed member and then apply thereon the molding composition for the solid visible part and cure same.

An advantageous energy and time-saving mode of operation resulting at the same time in a homogeneous, adhesive bond, is the wet-in-wet process wherein the foamable mixture is applied to the not-yet-cured molding composition of the visible part, and curing of visible part mixture and foamed member mixture takes place simultaneously.

Optionally, the molding composition of the visible part can be combined with an organic foamed member in a mold and bonded to the latter during the curing step. For producing a triple composite according to this invention, the procedure is preferably such that an organic foamed member is inserted in the mold in such a way that, during blowing and curing of the inorganic foam member composition, a composite is produced. This inorganic foamed member can be bonded to the visible part as explained above.

Preferably, the molding compositions contain 1.3–10, very preferably 2–6 parts by weight of oxide mixture; 0.5–2.5, very preferably 0.8–1.6 parts by weight of K$_2$O per part by weight of dissolved SiO$_2$ from the alkali silicate solution. K$_2$O is preferred as the sole or predominant alkali ingredient, since Na shows blooming during weathering of the construction facing.

The water content of the molding compositions can be about 20–60% by weight, based on these active ingredients of the molding composition, i.e., without calculation of the fillers.

Fillers can be contained in quantities of up to 1,000 g, preferably up to 400 g, per 100 g of the stoneforming components.

Suitable molds can consist of metals, wood, plastics, such as thermoplastics, silicone rubber, or foamed synthetic resins. Large-area molds require reinforcement. The molds can be filled partially or preferably fully, for example, with the aid of a vent opening.

The alkali silicate solutions preferably are the known, strongly alkaline aqueous solutions of alkali (i.e., potassium) silicate, i.e., vitreous, water-soluble alkali silicates solidified in the melt flow, obtained by melting together quartz sand and alkali carbonates or hydroxides. Molar ratios of 1.2–5 moles of SiO$_2$ per mole of alkali oxide, and water contents of 40 to above 70% by weight are possible, wherein the solutions having a lower water content are preferred. Along the lines of the present invention, an aqueous solution of an alkali silicate can also be obtained by dissolving the amorphous, aqueous silicic acid in alkali hydroxide solutions or, optionally, by the addition of solid alkali hydroxide with liquefaction under agitation. In spite of impurities present, filtration or purification is unnecessary. Alkali silicate solutions prepared in this way, while having the same alkali/SiO$_2$ ratio, frequently deviate in viscosity from that of commercially available wafer glass.

The oxide mixture, usable according to this invention with contents of amorphous SiO$_2$ and aluminum oxide, exhibits greatly varying contents of both oxides; the combined proportion of these oxides is frequently between about 70% and 95% by weight of the oxide mixture, but contents lower than 70% by weight, and higher contents of other oxides are also possible. The oxide mixture is anhydrous. It consists exclusively or quite predominantly of mixtures of oxides. It is pulverulent, thus promoting reactivity. Such oxide mixtures are produced, for example, in the high-temperature melting processes from the vapor or gaseous phase from which they are separated during cooling as a finely divided dust. Suitable oxide mixtures are produced in melting processes during production of various types of corundum, of mullite, in some cases, also during production of elemental silicon, ferrosilicon or in metal smelting. Frequently, the oxide mixtures do not correspond to the composition of the industrial melt product.

The roentgenogram shows no indication of crystalline SiO$_2$ while Al$_2$O$_3$ is present in crystalline form at least in part as α-Al$_2$O$_3$ (corundum) and in varying proportions as alkali-containing β-Al$_2$O$_3$. Iron oxides may be present, for example, as Fe$_2$O$_3$. Alkaline earths, especially CaO, are present in some cases in minor amounts. Small proportions of fluorides, P$_2$O$_5$ or ZrO$_2$, can occur in dependence on the respective melt product.

The oxide mixtures can contain 7–75% by weight of $SiO_2$ and 12–87% by weight of $Al_2O_3$, wherein the high $SiO_2$ contents or high $Al_2O_3$ contents may occur.

Finely divided fillers, colorants such as, in particular, pigment dyes, and numerous auxiliary agents, can be added to the molding composition.

Suitable fillers are preferably inorganic compounds in ground or divided form, for example, rock flours, basalts, clays, feldspars, ground mica, ground glass, quartz sand or quartz powder, ground bauxite, hydrated alumina, wastes from the alumina, bauxite, or corundum industry, ashes, slags, fibrous materials such as synthetic fibers or mineral wool, inert, non-water-soluble mineral and, optionally, organic materials; in the case of foamed articles, lightweight materials such as powdered pumice, vermiculite, etc. Metallic reinforcements can be inserted in the mold.

Suitable blowing agents are gas-forming compounds or admixed gases. Especially suitable are peroxides, such as perborate, $NaBO_2 \cdot H_2O_2 \cdot 3H_2O$, organic peroxides, $H_2O_2$ with decomposition temperatures of between room temperature and the curing temperature, as well as aluminum powders having a surface film that cannot be attacked at normal temperature, or in not desensitized form.

In this connection, with respect to sodium perborate and $H_2O_2$, respectively, quantities of 0.5–4% by weight, based on the molding composition to be foamed and, in case of aluminum powder, 0.05–0.8% by weight, are considered adequate.

In case of flowable molding compositions, initial curing can take place by heating in the mold until an adequate "green strength" has been attained permitting unmolding. Curing under heat until the respectively best physical properties have been attained can then follow. The curing of flowable molding composition in the mold is likewise possible. In press-molding compositions, curing can always be effected economically after unmolding.

The curing temperatures range maximally at 200° C. and thus afford the advantage of energy savings, as compared with numerous traditional products, for example, of construction ceramics.

The curing temperatures are generally 50°–200° C. Initial curing in the mold can be conducted at 50°–150° C., another curing step can be performed at 80°–200° C. The curing times range between about 0.1 and 3 hours. The pressing pressure during press-molding is in the range of from 10 to 500 bar.

Normally, no water loss is incurred during curing. Drying takes place without the aid of technological measures by itself during storage in the air or preferably at an elevated temperature.

The components can be mixed together in any desired sequence. The solid ingredients and the liquid ingredients are thoroughly mixed with the aid of an agitator or, if desired, by kneading.

Figure 1B:
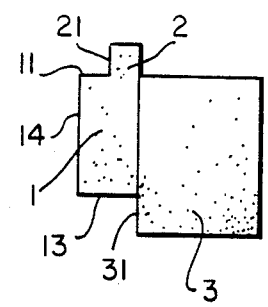
Figure 1C:
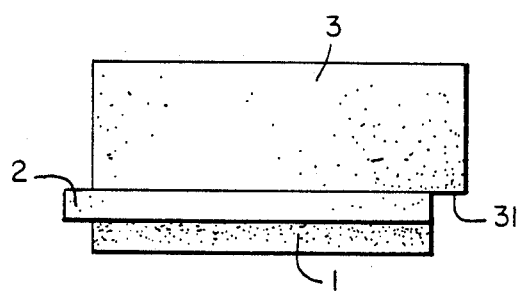
Figure 2A:
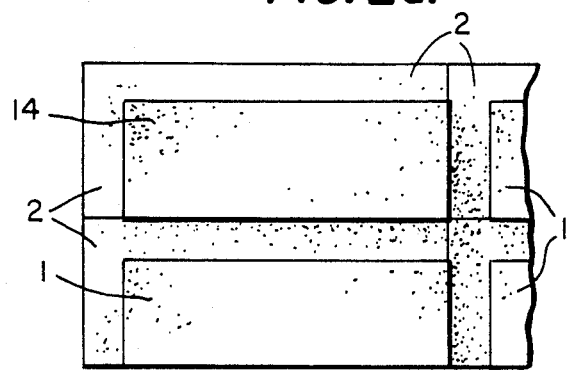
Figure 2B:
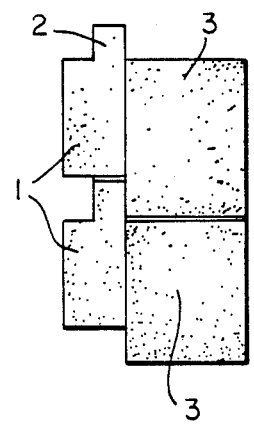
Figure 2C:
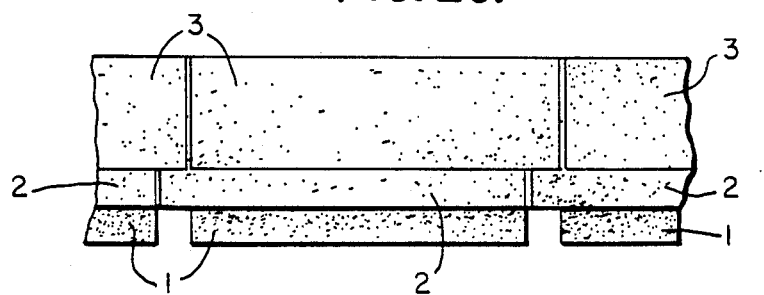

The moldings of this invention, produced from the molding compositions, are illustrated in examples in the drawings and will be described in greater detail below with reference thereto. In the drawings:

FIGS. 1a, 1b and 1c, respectively, show a rectangular construction facing element in a front side and top view; and FIGS. 2a, 2b and 2c show, respectively, an arrangement of rectangular construction facing elements according to FIG. 1 as part of a building facade, in a front side and top view.

The facing for a building component illustrated in FIGS. 1a, 1b and 1c, is a composite molded article made up of a solid molded part or member 1,2 and a molded foam part 3 cast thereon, for example; this facing was produced in a combination mold by pouring a composition that is not foamable into the mold and pouring a foamable molding composition, forming the molded part 3 thereon, and curing the product in the mold. The building facing comprises the solid (i.e., non-foamed) molded part 1,2, the uncovered outer surface 14 of which represents the optionally profiled visible surface. Continuous, projecting ribs 2 of a rectangular cross-section are formed on two successive lateral faces 10,11 of the molded body 1; these ribs are recessive when the view is directed on the visible surface 14, and can optionally be colored. The cast-on foamed member 3 projects at the two other adjoining lateral faces 12,13 past the solid part 1,2, with a width 21 corresponding approximately to the width of the projecting ribs 2. Accordingly, the ribs 2 form, along two sides of the construction facing element, anchoring webs and, along the two other sides, the foamed member 3 forms support surfaces 31 for the ribs of the adjoining construction facings to form a composite in the manner of a masonry when built up into a building facade.

The composite of a building facade made up of rectangular construction facings, shown in front view (FIG. 2a), in a side view (FIG. 2b), and in a top view (FIG. 2c) illustrates the visible surfaces 14 facing the observer and the rectangular ribs 2, which are offset and act as a false joint. The rectangular ribs 2 furthermore act in the composite as anchoring webs with respect to neighboring construction facings, just as the support surfaces 31 of the foamed member 3, projecting downwardly and toward one side. The foamed members 3, cast from a blowable organic molding composition according to this invention and anchored firmly to the visible surface by casting, effect due to their thickness, a heat insulation, forming by abutment of the foamed members 3 of all construction facings a practically closed heat insulation and noise insulation layer; additionally, due to the ribs 2, there are no joints extending through to the visible side. Therefore, in general, the construction facings can be placed one on top of the other without anchoring same, on account of the given anchoring and dimensional stability of ribs and molding surfaces; consequently, only the rear sides of the foamed members 3 are to be anchored to the wall, for example, by means of an adhesive.

The process and product of this invention will be described in greater detail by means of the following examples:

EXAMPLE 1

100 g of a solution of precipitated amorphous silicic acid in a potassium hydroxide solution with a water content of 47% by weight and a molar ratio of $SiO_2$:$K_2O$ of 1.5 is thoroughly mixed in a weight ratio of 1:1 with 100 g of a powdered reactive oxide mixture containing 35% by weight of amorphous $SiO_2$, 55% by weight of aluminum oxide and other oxides, as well as with finely ground fillers, namely 100 g of quartz sand, 100 g of ground quartz, and 15 g of a mixture of synthetically manufactured fibers of calcium silicate and polyacrylonitrile fibers, and poured into a mold exhibiting a natural-stone texture. After venting by shaking, a foam panel with a thickness of 15 mm, made of polystyrene, is placed thereon and the composition is cured in the closed mold for 30 minutes at 90° C. After unmolding and drying at 85° C., the visible face of the molded articles is varnished with a weather-resistant resin lacquer.

EXAMPLE 2

70 g of potassium silicate with a water content of 60% by weight and a molar ratio of $SiO_2:K_2O$ of 2.9:1 is mixed under cooling to temperatures below 30° C. with 14 g of solid KOH (90% by weight). Thereupon, 70 g of a pulverulent, reactive oxide mixture containing 8.5% of amorphous $SiO_2$, 81% by weight of $Al_2O_3$ and further oxides, as well as ground fillers: 25 g of fireclay, 25 g of ground slate, 25 g of ground basalt, 25 g of quartz sand, and 10 g of glass fiber, as well as 5 g of carbon black, is mixed with the solution and kneaded and thereafter poured into a mold having the texture of natural slate, vented, cured for 30 minutes at 80° C. and, after unmolding, furthermore dried at 80° C. The black material, after varnishing, can be used as wall facing and can be bonded, for example, to a preformed foamed article.

EXAMPLE 3

75 g of a solution produced from KOH, water and amorphous, aqueous silicic acid with a water content of 52% by weight with a molar ratio of $SiO_2:K_2O$ of 1.3:1 is thoroughly intermixed in a masticator with 120 g of an oxide mixture containing 47% by weight of amorphous $SiO_2$, 43% by weight of $Al_2O_3$ and other oxides, using as fillers 250 g of a fly ash from a power plant, 50 g of ground quartz, as well as fibrous and coloring materials, then extruded into a ribbon with the aid of the fishtail port of an extruder. This ribbon is subsequently cut, pressed in a mold, cured at a temperature of 85° C. By the molding step, the shaped articles have the surface texture of a quarry stone wall. A foamable, inorganic mixture as hereinafter described in Example 6 is then applied to these moldings, foamed and cured. After drying, the molded components are impregnated with a building protection agent based on an alkoxyalkyl silane and utilized as facade facing.

EXAMPLE 4

Solid water glass with a $SiO_2:K_2O$ molar ratio of 3:1 is dissolved by means of an aqueous KOH solution of 50% by weight and adjusted to a molar ratio of $SiO_2:K_2O$ of 2:1 and to a water content of 48% by weight. This solution is mixed with an oxide mixture containing 70% by weight of amorphous $SiO_2$, 14% by weight of $Al_2O_3$ and other oxides in a weight ratio of 1:1.5 and kneaded with 200% of fillers, based on the amount of reactants, of equal parts of red sludge (waste product of aluminum production), quartz sand, quartz powders and fireclay. The composition is press-molded and cured in a mold having the structure of hand-shaped brick under pressure at 80° C. for 30 minutes. After unmolding, curing is conducted at 90° C. Subsequently an arrangement of several molded components with jointed brick format is firmly bonded with heat-insulating foam materials on organic or inorganic basis by backing with a foam layer.

EXAMPLE 5

75 g of a solution of amorphous, aqueous silicic acid in KOH with a water content of 50% by weight and a molar ratio of $SiO_2:K_2O$ of 1.2:1 is prepared, cooled to room temperature, and mixed with 150 g of an oxide mixture with 30% by weight of amorphous $SiO_2$, 60% by weight of $Al_2O_3$ and other oxides, as well as ground fillers in the form of 100 g of feldspar, 50 g of ground basalt, 50 g of quartz powder, and 50 g of the aforementioned fly ash, in a thorough mixing step, then filled into molds, and dried and cured and processed in accordance with Example 1.

EXAMPLE 6

200 g of a potassium-alkaline solution of aqueous, amorphous silicic acid, containing 53% by weight of $H_2O$, 23.5% by weight of $SiO_2$ and 23.5% by weight of $K_2O$ is mixed homogeneously with 400 g of an oxide mixture containing 46% by weight of amorphous $SiO_2$ and 43% by weight of $Al_2O_3$, as well as $Fe_2O_3$ and other oxides and, as the blowing agent, 15 g of $NaBO_2 \cdot H_2O_2 \cdot 3H_2O$, and poured into a mold having a suitable volume and closable all around; in the mold, the cured solid molding for the visible part has already been deposited. The closed mold is heated to about 80° C., whereby oxygen is released and the composition is foamed up. The molding is cured within 30 minutes and can be removed from the mold. The thus-unmolded foam member is dried for another 30 minutes at temperatures of 90° C. The density of the resultant, open-pore foam is 450 kg/m³.

EXAMPLE 7

150 g of a potassium-alkaline solution of amorphous, aqueous silicic acid containing 48% by weight of $H_2O$, and $SiO_2$ and $K_2O$ in a molar ratio of 1.5:1, is mixed with 250 g of an oxide mixture containing 70% by weight of amorphous $SiO_2$ and small contents of $Al_2O_3$ and other oxides and, as the blowing agent, with 0.5 g of pulverized aluminum (desensitized with the Ca salt of a fatty acid) and poured into a mold. After closing the mold except for a small bleeder opening (for the escape of excess amounts of gas), the composition is foamed within 10 minutes by heating to 80° C. and cured. After unmolding, the product is dried at 80° C. The resultant foam element has a density of 380 kg/m³.

By insertion of a solid mold, for example, produced according to Example 2, the desired composite is created for the construction facing panel.

EXAMPLE 8

A potassium-alkaline silicic acid solution, prepared from amorphous, aqueous silicon dioxide and KOH solution, with a molar ratio of $SiO_2:K_2O=1.4:1$, is mixed with an oxide mixture containing 50% by weight of amorphous $SiO_2$, 35% by weight of $Al_2O_3$ and further oxides in a weight ratio of 1:1 and, after adding 10% by weight of mica and 0.3% by weight of pulverized aluminum (not desensitized), foamed in about 50 minutes and cured by the evolving heat of reaction; in this process, a preformed, organic foam (EPS, PUR or polyethylene) serves as the substrate for the inorganic composition to be foamed, and is bonded to the latter by the curing step. This preliminary composite can be provided, for example, with a visible part according to Example 2 wherein the preformed composite is introduced into the mold and bonds to the applied, solid molding composition during the curing process.

What is claimed is:
1. A facing for use as a building component comprising a solid molding having a visible part of a cured, inorganic molding composition with a specific gravity of 1.3–2.5 g/cm$^3$ produced from:
- 10–30% by weight of an aqueous, potassium-alkaline potassium silicate solution;
- 15–40% by weight of a reacitve pulverulent oxide mixture with contents of amorphous SiO$_2$ and aluminum oxide; and
- 20–75% by weight of fillers; and
- a foam member bonded to the visible part, said foam member having a foamed structure comprised of an inorganic or organic foam material.

2. A facing for use as a building component according to claim 1, wherein a projecting rib flush with the underside of the solid molding is molded to a solid body portion, which body portion is fashioned with rectangular basal area, along two successive sides, and the foam member is fashioned, in the zone of the ribs, to be in alignment with the sides of the body portion and projects past the molding body portion alongside the two sides of the body portion that are free of a rib, with a width corresponding approximately to the width of the rib.

3. A facing for use as a building component according to claim 1 wherein the foam member consists of an inorgainc, cured and foamed panel, said panel having been prepared from a molding composition containing:
- 20–60% by weight of an aqueous, potassium-alkaline potassium silicate solution;
- 30–80% by weight of a reactive, pulverulent oxide mixture with contents of amorphous SiO$_2$ and aluminum oxide;
- 0–50% by weight of fillers; and
- 0.5–5% by weight of a blowing agent with a gas formation temperature of between 20° and 95° C.

4. A facing for use as a building component according to claim 2 wherein the foam member consists of an inorganic, cured and foamed panel, said foamed panel having been prepared from a molding composition containing:
- 20–60% by weight of an aqueous, potassium-alkaline potassium silicate solution;
- 30–80% by weight of a reactive, pulverulent oxide mixture with contents of amorphous SiO$_2$ and aluminum oxide;
- 0–50% by weight of fillers; and
- 0.05–5% by weight of a blowing agent with a gas formation temperature of between 20° C. and 95° C.

5. A facing for use as a building component according to claim 3, wherein said composition contains as the blowing agent 0.5–4% by weight of sodium perborate or H$_2$O$_2$, respectively, based on the molding composition.

6. A facing for use as a building component according to claim 4, wherein said composition contains as the blowing agent 0.5–4% by weight of sodium perborate or H$_2$O$_2$, respectively, based on the molding composition.

7. A facing for use as a building component according to claim 3, wherein said composition contains as the blowing agent 0.05–0.8% by weight of pulverized aluminum, based on the molding composition.

8. A facing for use as a building component according to claim 4, wherein said composition contains as the blowing agent 0.05–0.8% by weight of pulverized aluminum, based on the molding composition.

9. A facing for use as a building component according to claim 1, wherein said molding composition contains, as the fillers in finely divided form, rock flours, basalts, clays, feldspars, ground mica, ground glass, quartz, bauxite, hydrated alumina, wastes from the alumina, corundum, bauxite manufacture, ashes, slag, fibers such as synthetic resin fibers, mineral fibers, vermiculites, ground pumice or the like, and mixtures thereof 10. A facing for use as a building component according to claim 1 wherein the visible surface of the visible part is fashioned to be textured, embossed, decorated or the like.

11. A facing for use as a building component according to claim 1, wherein reinforcing inserts of metal and/or synthetic resins and/or glass fibers are provided in the molding composition.

12. A facing for use as a building component according to claim 2, wherein the foam member consists of polystyrene, phenolic resin, or polyurethane foam.

13. A wall arrangement comprised of the facing according to claim 2 wherein one of the facings is positioned vertically above another with the rib of the lower facing contacting both a bottom surface of the body or the upper facing and a front surface of the foamed member.

* * * * *